(12) United States Patent
Løkka

(10) Patent No.: US 12,163,766 B2
(45) Date of Patent: Dec. 10, 2024

(54) CONTROL AND MONITORING DEVICES AND SYSTEM FOR SHOOTING RANGE

(71) Applicant: Travision AS, Strømmen (NO)

(72) Inventor: Simen Løkka, Strømmen (NO)

(73) Assignee: Travision AS, Strømmen (NO)

( * ) Notice: Subject to any disclaimer, the term of this patent is extended or adjusted under 35 U.S.C. 154(b) by 463 days.

(21) Appl. No.: 16/618,334

(22) PCT Filed: May 31, 2018

(86) PCT No.: PCT/NO2018/050143
§ 371 (c)(1),
(2) Date: Nov. 29, 2019

(87) PCT Pub. No.: WO2018/222052
PCT Pub. Date: Dec. 6, 2018

(65) Prior Publication Data
US 2021/0156652 A1 May 27, 2021

(30) Foreign Application Priority Data
May 31, 2017 (NO) .................................. 20170901

(51) Int. Cl.
| F41J 11/00 | (2009.01) |
| F41J 5/10 | (2006.01) |
| F41J 5/26 | (2006.01) |
| F41J 9/18 | (2006.01) |
| G06Q 20/12 | (2012.01) |
| H04N 7/18 | (2006.01) |

(52) U.S. Cl.
CPC ............... *F41J 11/00* (2013.01); *F41J 5/10* (2013.01); *F41J 9/18* (2013.01); *H04N 7/181* (2013.01); *H04N 7/188* (2013.01); *F41J 5/26* (2013.01); *G06Q 20/12* (2013.01)

(58) Field of Classification Search
None
See application file for complete search history.

(56) References Cited

U.S. PATENT DOCUMENTS

| 5,991,043 A * | 11/1999 | Andersson ............ F41G 3/2611 356/400 |
| 2013/0169820 A1* | 7/2013 | Stewart .................. H04N 23/60 348/169 |

(Continued)

FOREIGN PATENT DOCUMENTS

EP 0797070 A2 9/1997

OTHER PUBLICATIONS

International Search Report and Written Opinion issued for International Patent Application No. PCT/NO2018/050143, dated Nov. 15, 2018 in 26 pages.

(Continued)

*Primary Examiner* — Rebecca A Volentine
(74) *Attorney, Agent, or Firm* — Knobbe, Martens, Olson & Bear, LLP

(57) ABSTRACT

A device, method and system for identification of a person participating in a range shooting activity, a token comprising at least an identification of a required shooting pattern and a communication means for communicating the required shooting pattern to a communication unit, and a device, system and method for image capture and analysis of a shooting session.

17 Claims, 17 Drawing Sheets

(56) References Cited

U.S. PATENT DOCUMENTS

Figure 1:
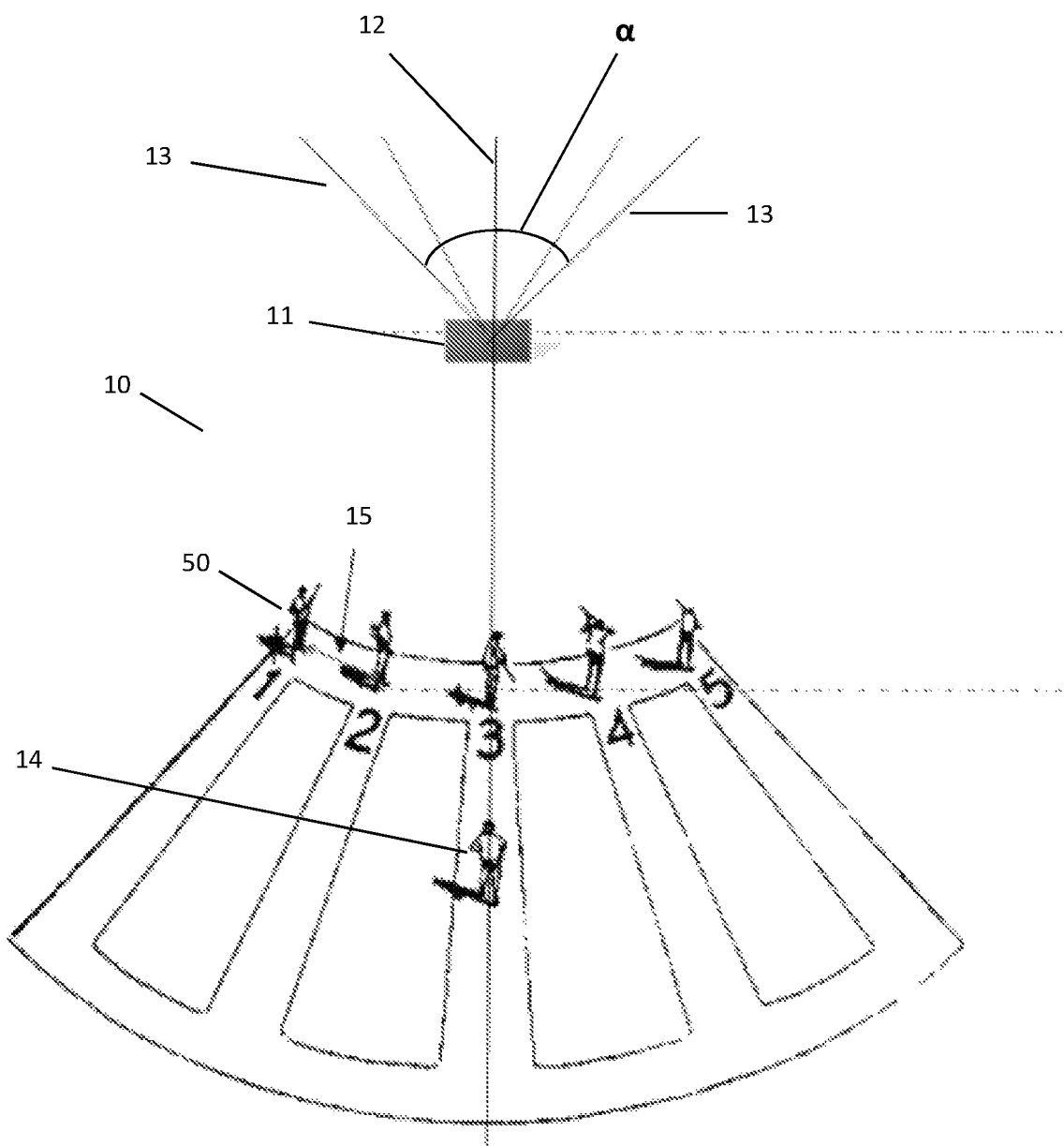

| | | | | |
|---|---|---|---|---|
| 2014/0092245 A1* | 4/2014 | Moore | ................... | F41J 5/10 |
| | | | | 348/143 |
| 2014/0335478 A1* | 11/2014 | Northrup | .............. | F41G 3/2633 |
| | | | | 434/22 |
| 2015/0091252 A1* | 4/2015 | Chadwick | ................ | F41J 11/00 |
| | | | | 273/359 |
| 2016/0209173 A1 | 7/2016 | Dribben | | |
| 2016/0298930 A1* | 10/2016 | Squire | ................... | F41G 3/2655 |
| 2016/0313097 A1* | 10/2016 | Miller | ...................... | F41J 5/056 |
| 2016/0373682 A1* | 12/2016 | DeAngelis | ......... | H04N 5/23293 |
| 2017/0321987 A1* | 11/2017 | Apkarian | ................ | F41A 33/04 |
| 2018/0216916 A1* | 8/2018 | Ostovich | ................... | F41G 3/26 |
| 2019/0056198 A1* | 2/2019 | Pautler | ..................... | G01C 3/02 |
| 2019/0195599 A1* | 6/2019 | Tinichigiu | ............ | G06K 9/6267 |

OTHER PUBLICATIONS

Norwegian Search Report issued for Norwegian Patent Application No. 20170901, dated Dec. 13, 2017 in 2 pages.

Coulson., "Real Time Positioning and Motion Tracking for Simulated Clay Pigeon Shooting Environments"; Master's thesis, Imperial College London, 2003.

\* cited by examiner

CONTROL AND MONITORING DEVICES AND SYSTEM FOR SHOOTING RANGE

The present invention is related to the field of shooting range, such as trap and clay pigeon, controlling and scoreboard monitoring, and provides devices and system for personalization and customized setup and communication of such shooting range controlling and scoreboard monitoring.

Presently, there are at least three basic types of setup for clay pigeon shooting ranges: "trap", "skeet" and "sporting" involving correspondingly one, two and many (more than two) clay pigeon launching units serving a shooting range. Each launching unit is normally arranged to throw a clay pigeon according to a preset throwing pattern.

In a shooting session which may comprise a number of shooters lined up in a shooting stand, the launching units may be voice controlled by the individual shooter. The same setup is used for all shooters in a shooting session.

A shooter normally pays for cartridges when registering for a shooting session, and will then get an allocated slot in a shooting session. The process is resource demanding, and requires a detailed management by range personnel to keep track of and offer result services for the individual needs of the shooters.

Although there are several systems in use today for automating the launching units and command input, there is a problem that each shooting session requires competent resources to setup the stands and launching units if the next shooting session requires a different setup. Also there are a throughput issue that any shooter requiring a specific setup for his/hers shooting session must wait until the range keeper is configuring this specific setup in a shooting session. This may result in long waiting times and also sessions being executed without filling the shooter spaces available.

In a shooting session, there are normally a manual controller functions that register all clay pigeon hits, and keeps scorecards updated. This is a subjective assessment performed on every shot towards a flying pigeon. Although videotaping may result in a post discussion of the scoreboard after a shooting session, there is a problem to provide a good feedback to shooter except for a simple count of hits or non-hits.

Clay pigeon shooting is a sport ideal for being arranged as a competition. However, competition is limited to competition between participants at the specific arena. If a shooter is to compete with other athletes not present on site, the competition is limited to complex live picture coverage and coordination or to comparing scorecards when competition session is done. It is a problem that the individual athlete cannot influence his competitor selection, or control the competition environment. It is an aim for the invention to solve one or more of the above stated problems.

It is a goal for the present invention in a first embodiment to provide a system for automatic setup configuration of a clay pigeon shooting range, individually to each shooter irrespectively what shooting session the shooter gets his/her slot at the shooting range, thereby enabling the shooting range to use all available shooter position in each shooting sessions.

In a further embodiment the present invention provides a system for automatically detect and register hits, and in a further embodiment the hit or miss is presented visually to the shooter for analysis of the shots.

In another embodiment the present invention provides a system for promoting, and/or comparing and/or competing online with other viewers or shooters.

The system may further comprise credit escrow, enabling the shooter to register payment and receive credits for controlling the availability of the shooting range facilities.

The invention is defined by the accompanying independent claims, and alternative embodiments are defined by the corresponding dependent claims.

The following figures is provided as non-limiting examples of embodiments of various features of the invention, and is provided as support for the objects, aspects, and embodiments described in the description and claims.

Figure 2:
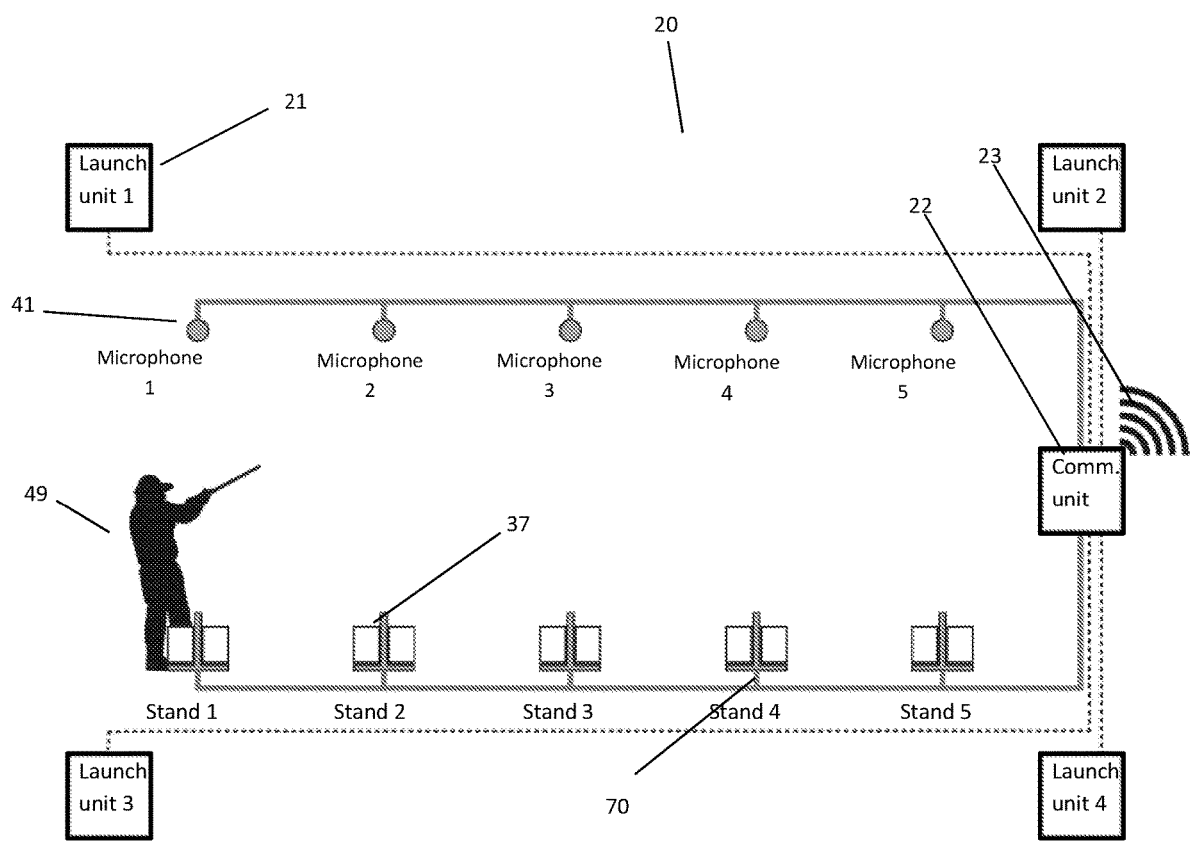
Figure 3A:
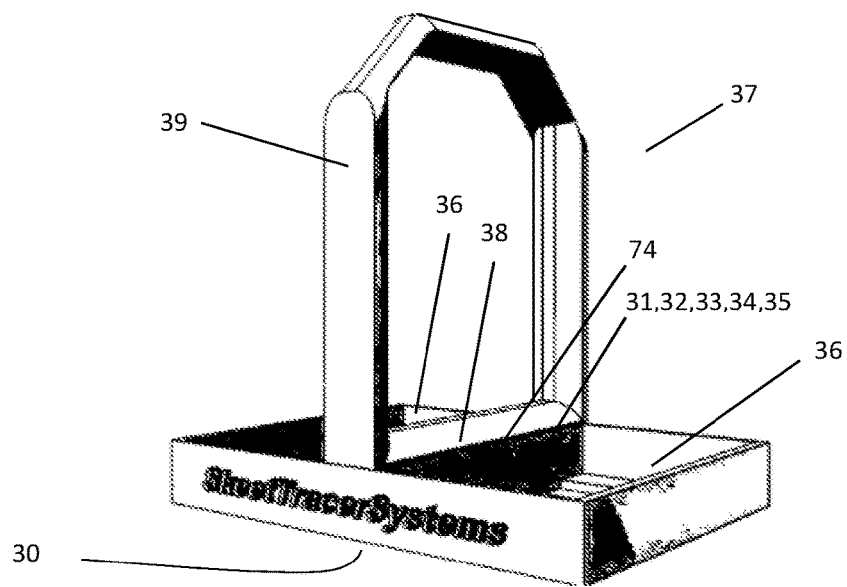
Figure 3B:
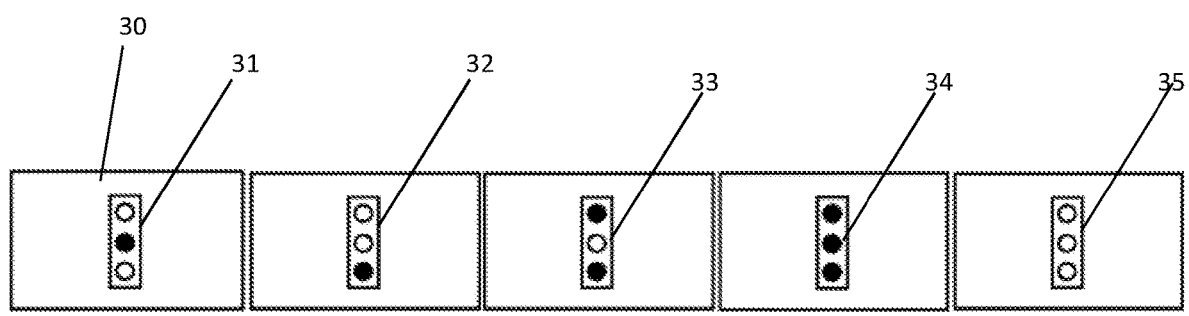
Figure 4:
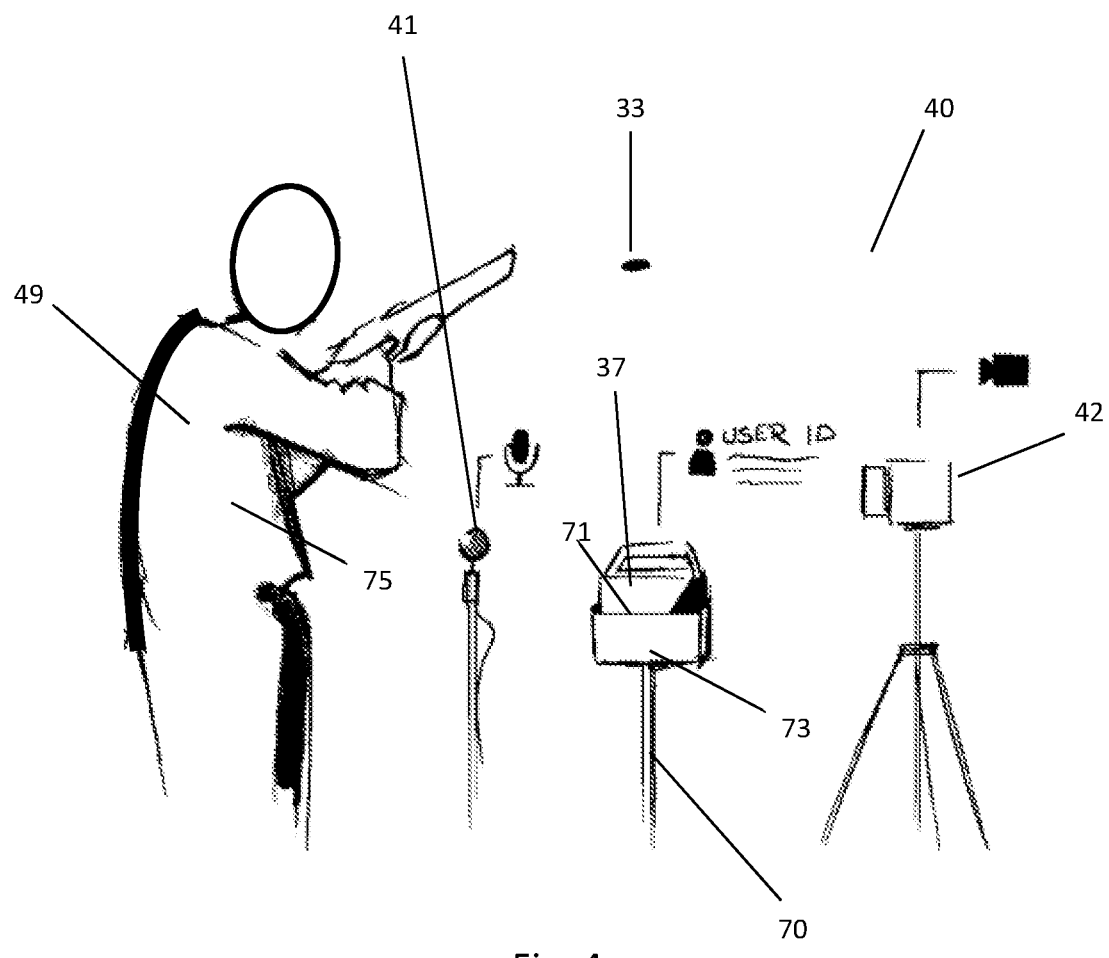
Figure 5A:
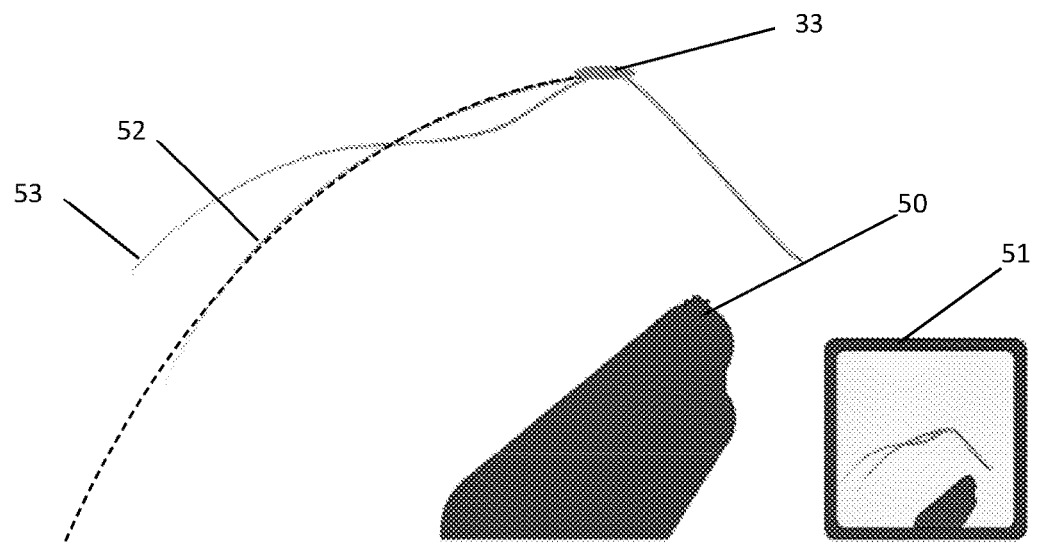
Figure 5B:
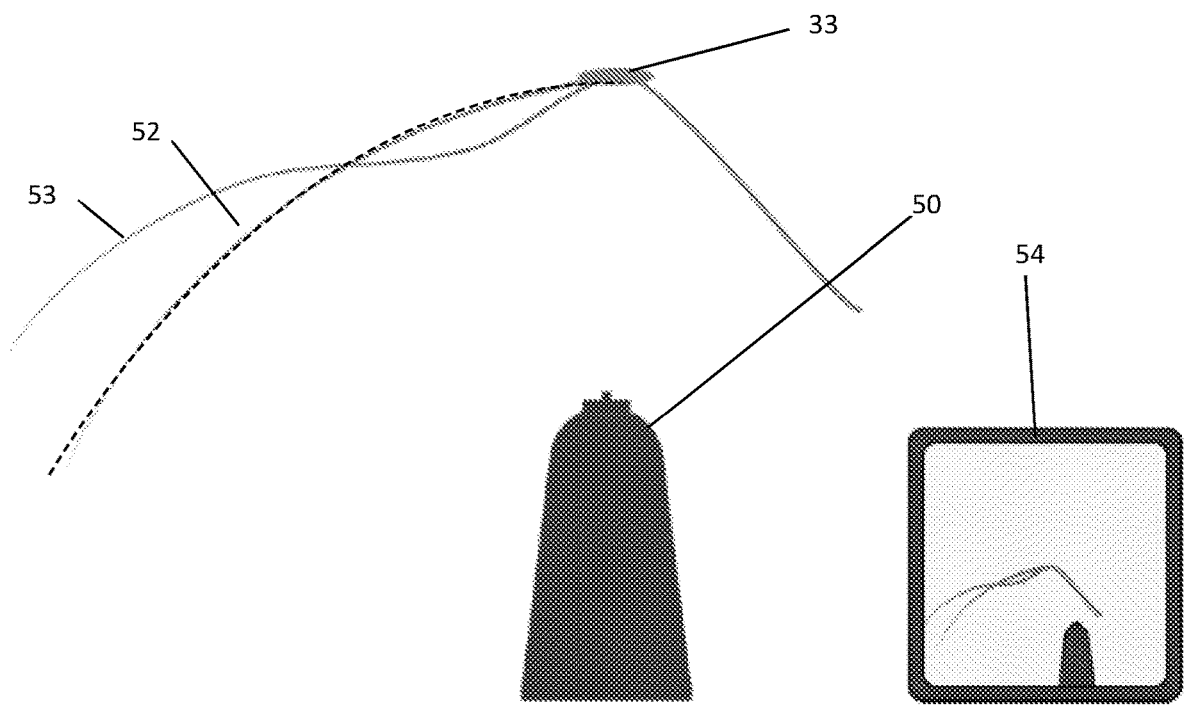
Figure 5C:
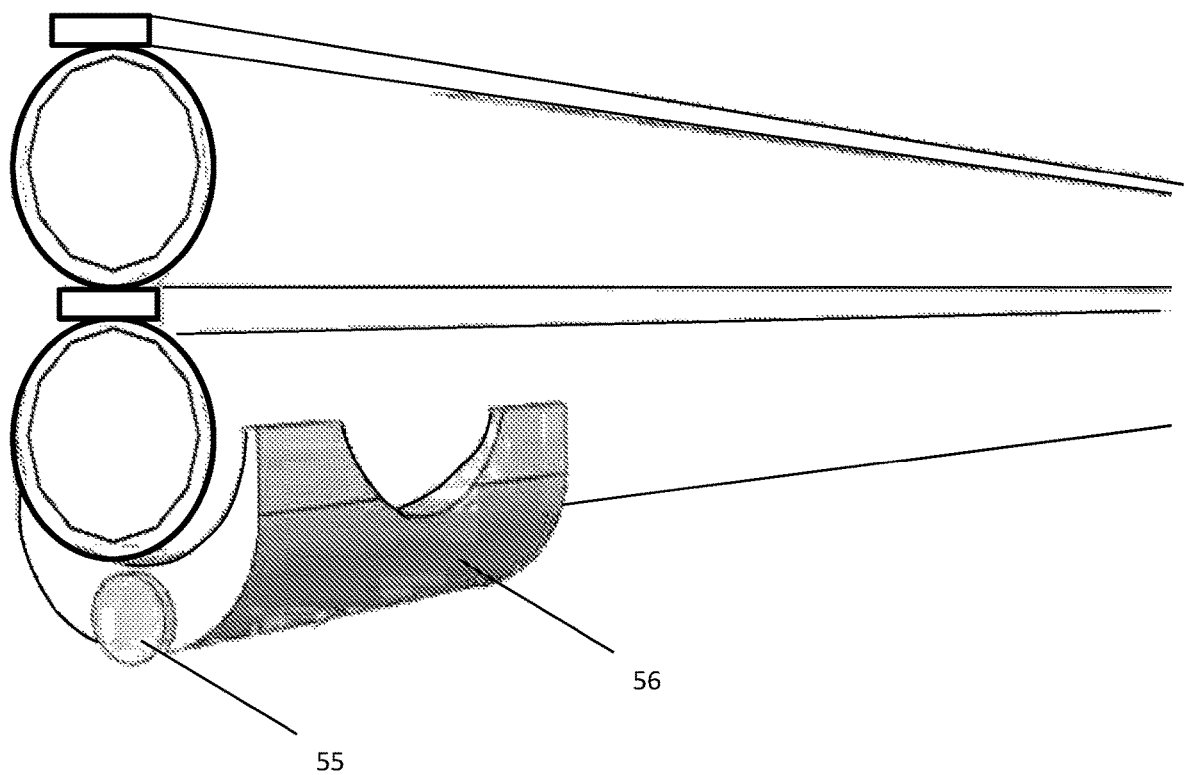
Figure 5D:
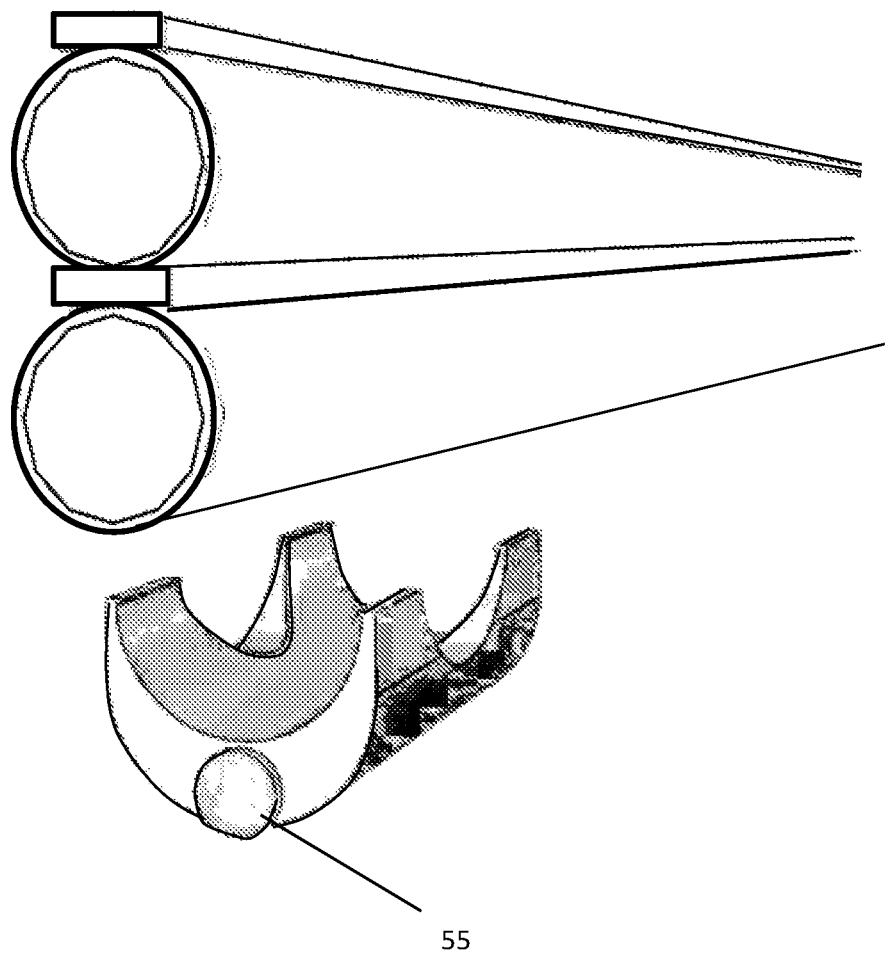
Figure 5E:
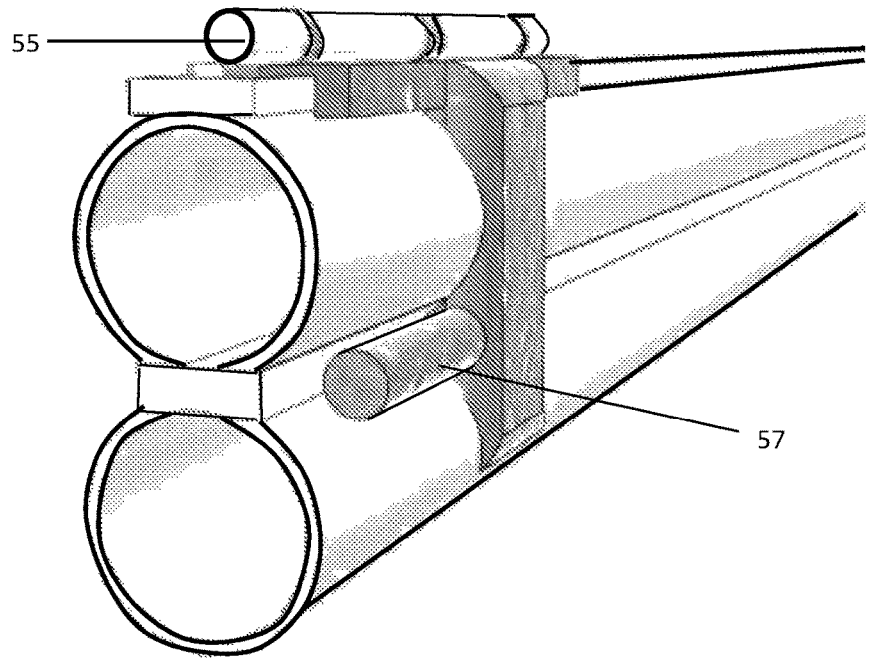
Figure 5F:
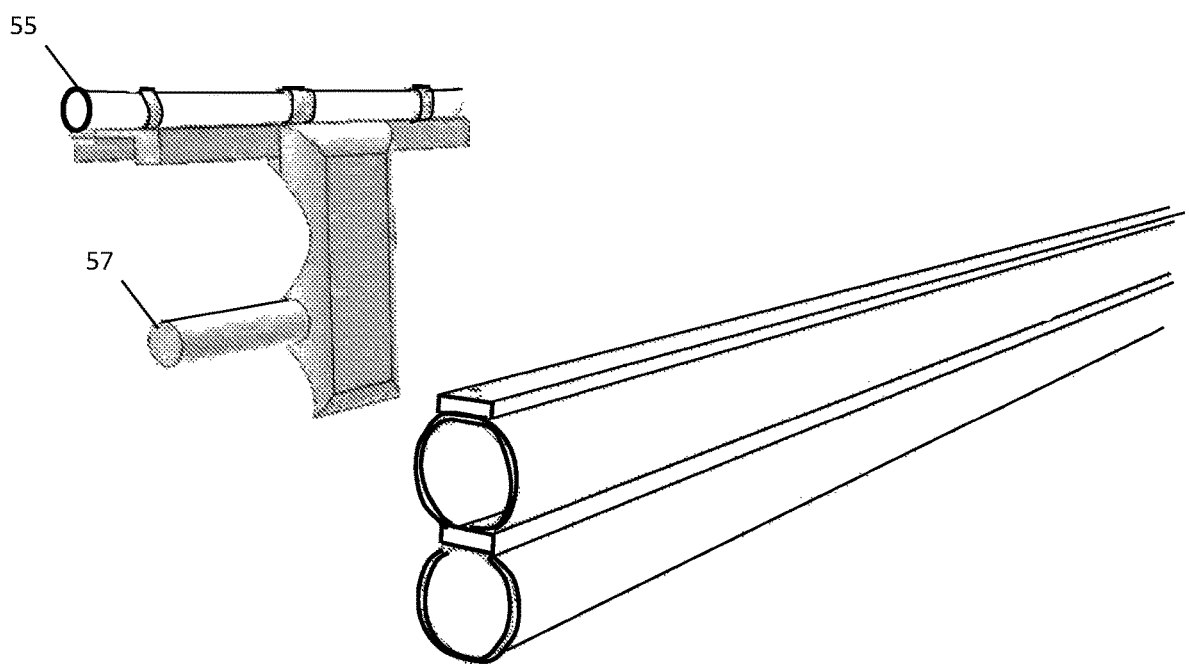
Figure 6:
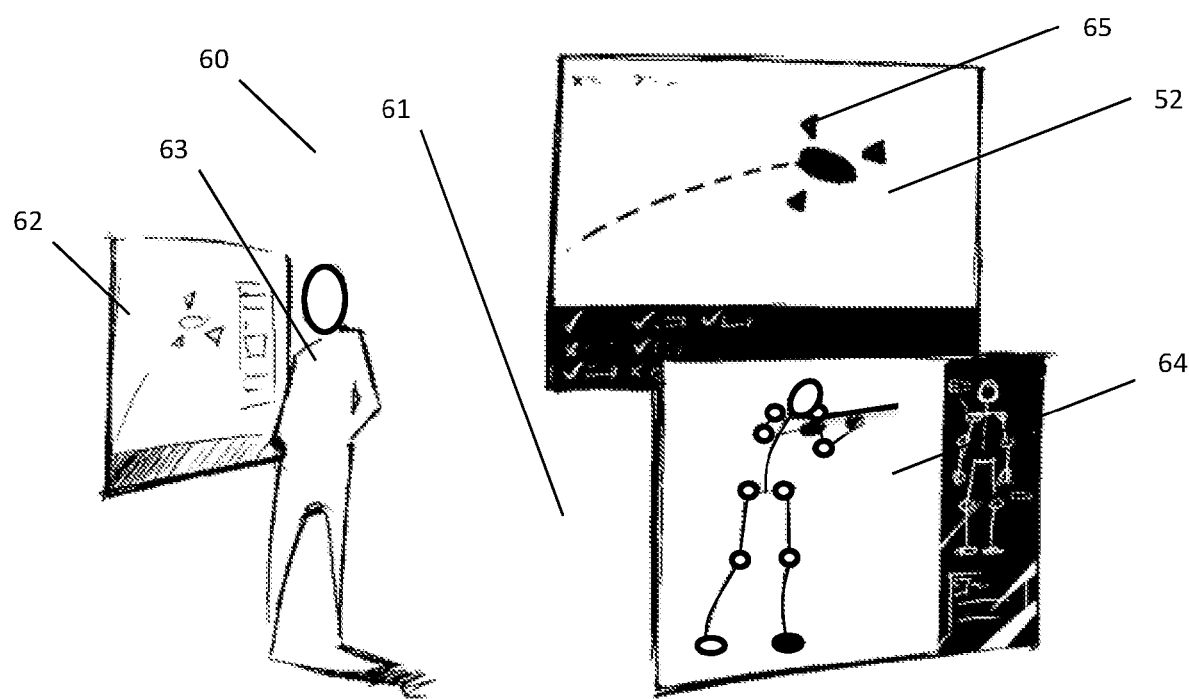
Figure 7:
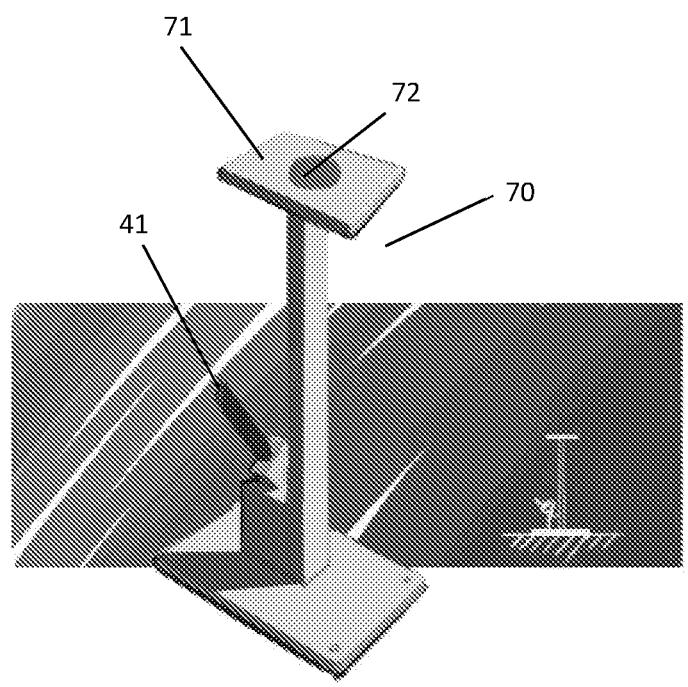
Figure 8A:
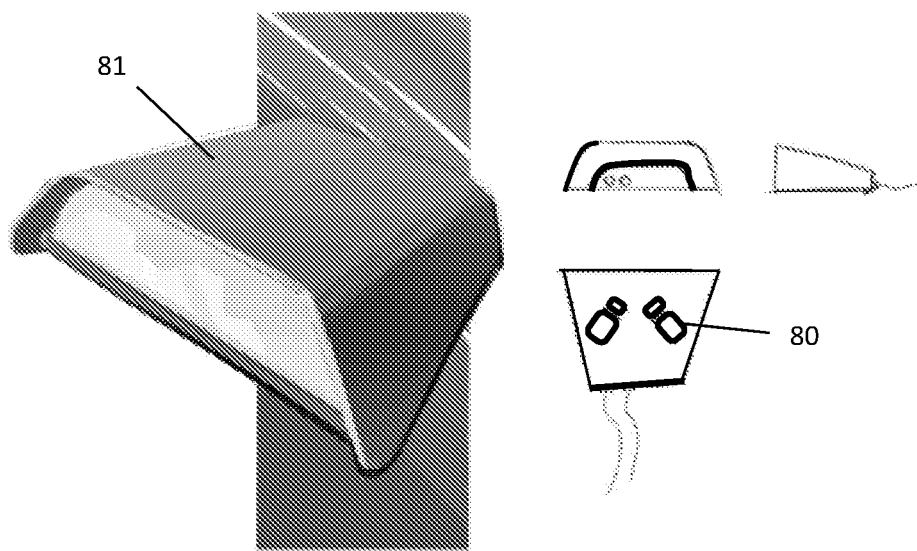
Figure 8B:
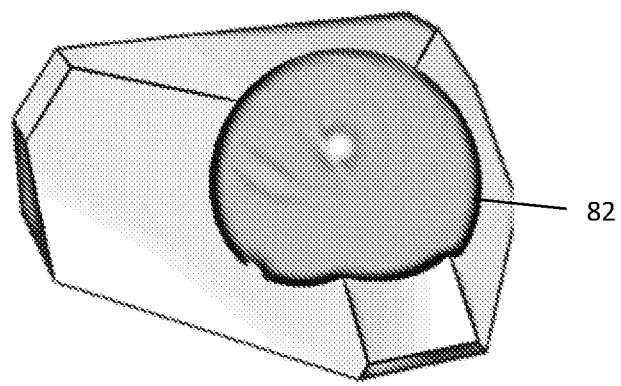
Figure 8C:
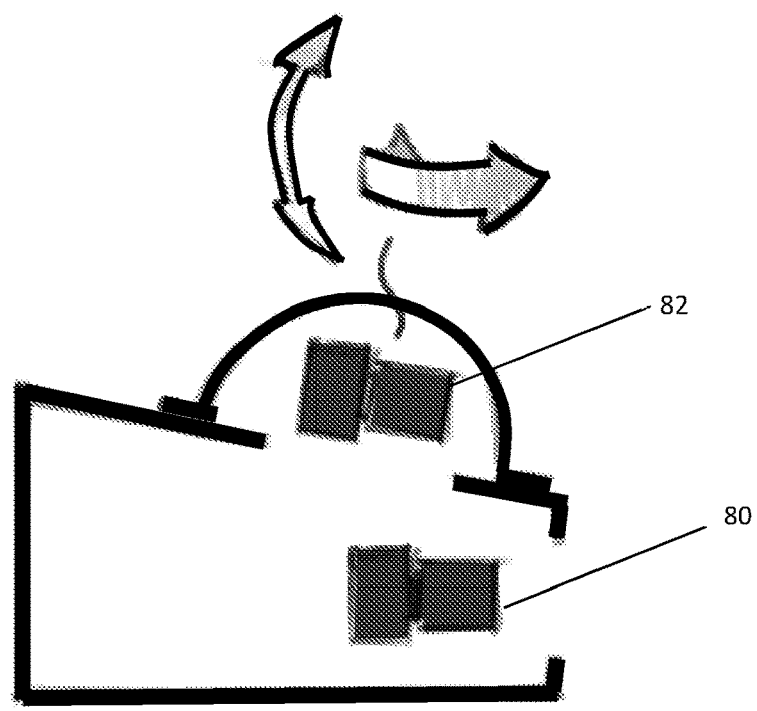
Figure 8D:
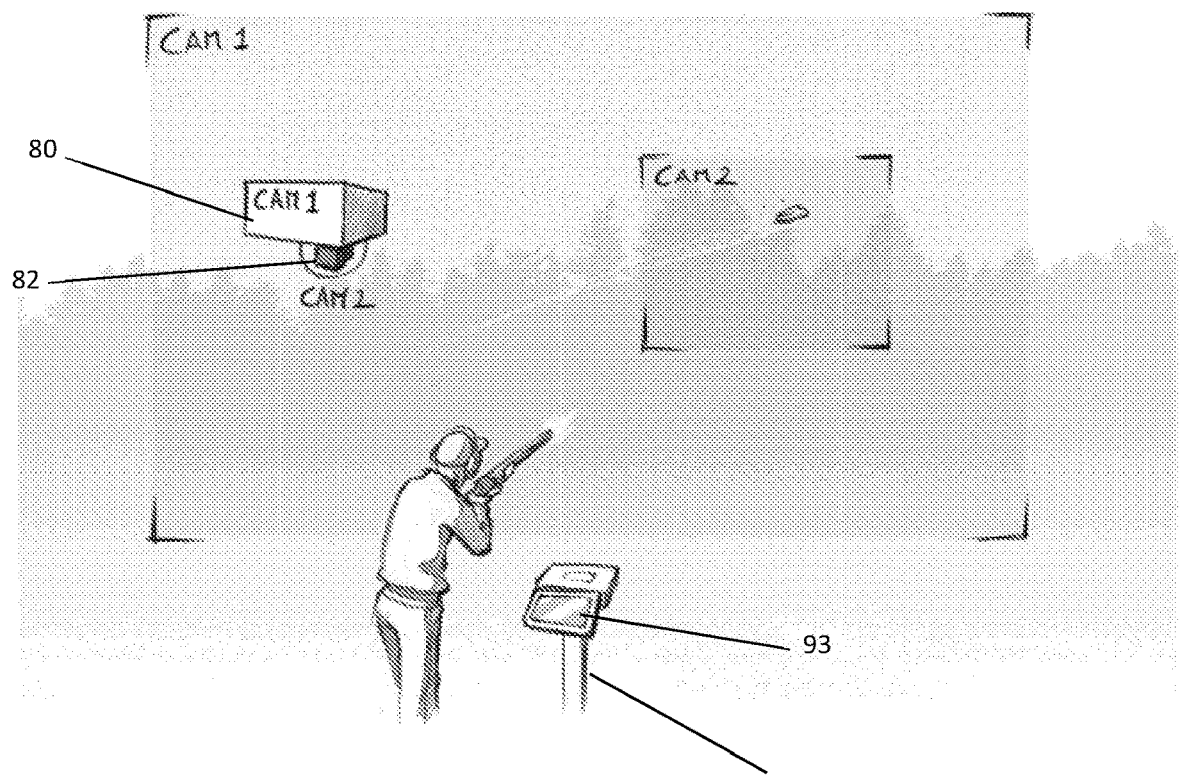
Figure 8E:
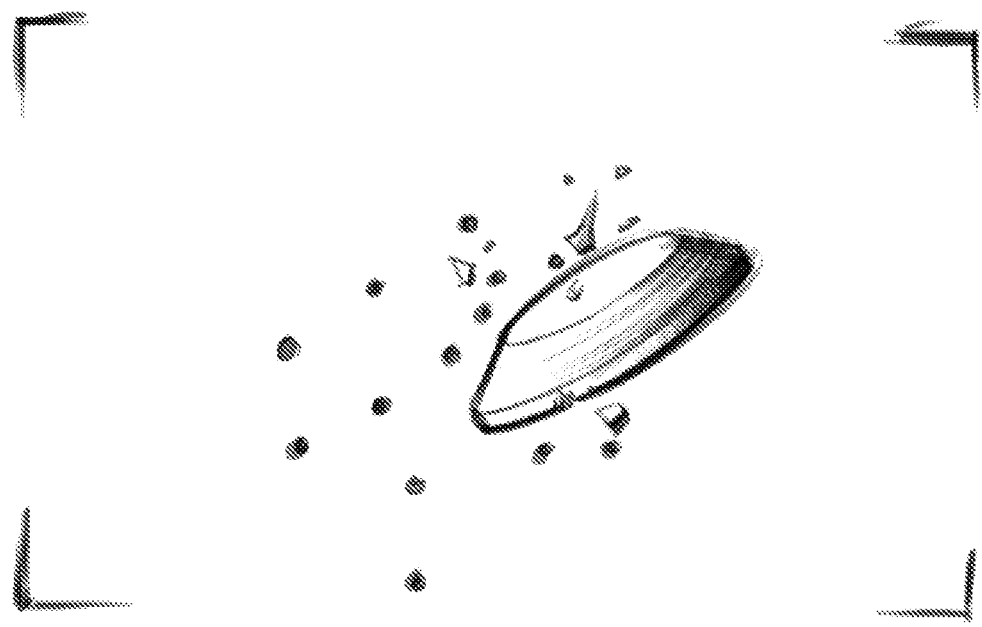
Figure 9A:
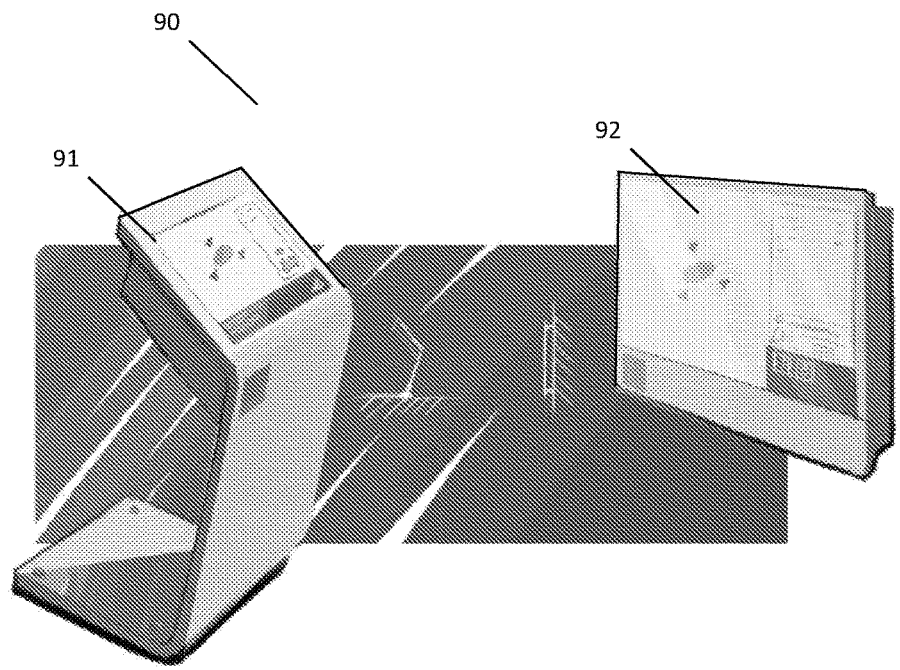
Figure 9B:
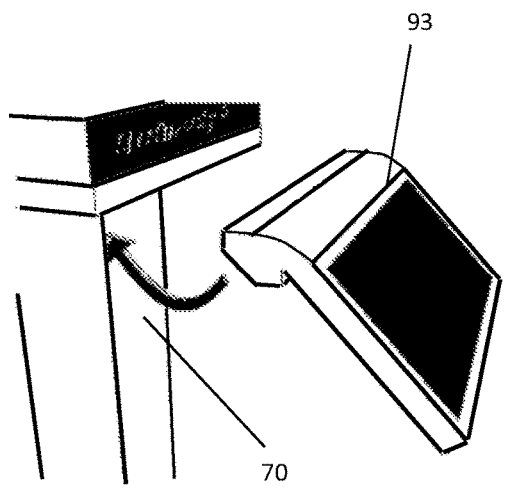
Figure 9C:
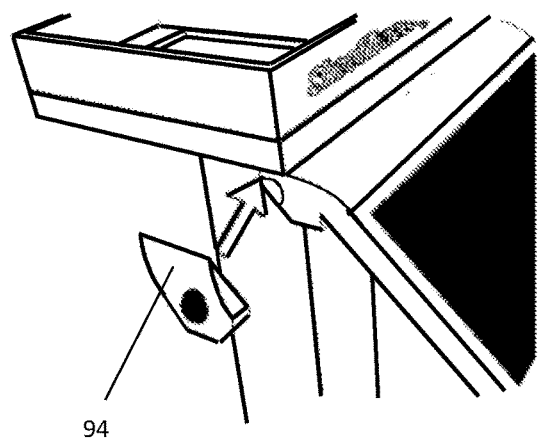
Figure 10:
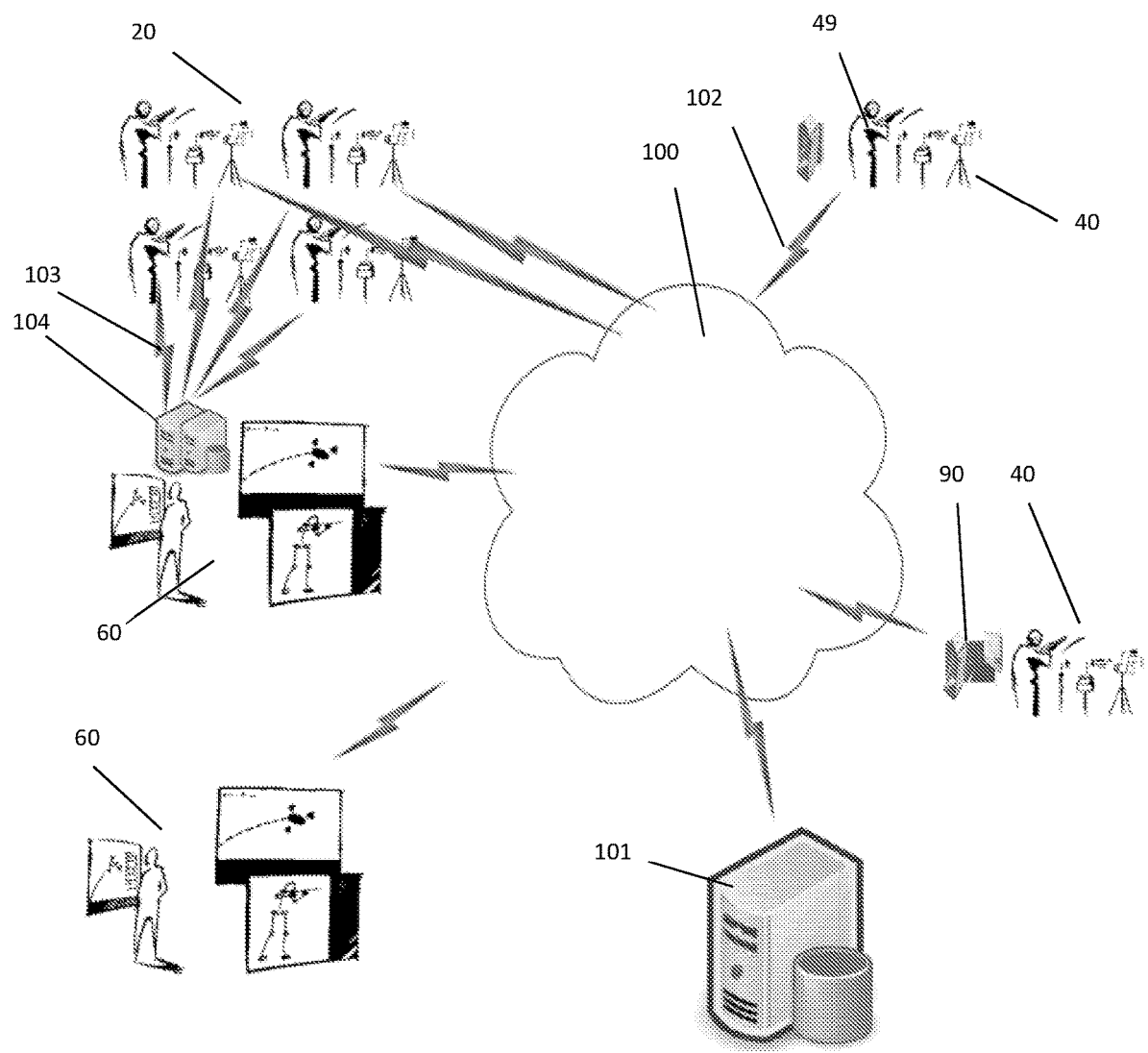

FIG. 1—Traditional clay pigeon shooting arena
FIG. 2—System description Clay pigeon shooting stand area
FIG. 3A—Basket comprising token for holding cartridges
FIG. 3B—Alternative identification regime
FIG. 4—Shooting stand for one shooter
FIG. 5A—Shooting session oblique camera
FIG. 5B—Shooting session gun pipe camera
FIG. 5C—Camera assembly mounted to underside of gun pipe
FIG. 5D—Camera assembly detached from underside of gun pipe
FIG. 5E—Camera assembly mounted to side of gun pipe
FIG. 5F—Camera assembly detached from side of gun pipe
FIG. 6—Feedback/review environment
FIG. 7—Stand
FIG. 8A—Camera house
FIG. 8B—Camera house high speed camera
FIG. 8C—Dual camera house high speed camera and range camera
FIG. 8D—Shooting stand and dual camera view
FIG. 8E—High speed camera view
FIG. 9A—Stand controlling unit and feedback screen
FIG. 9B—Stand with attachable mobile screen
FIG. 9c—Stand with pose camera
FIG. 10—Cloud/communication system The various features described herein are combined in certain ways to describe the embodiments in the figures. It should be understood that the figures are only used as an aid for understanding the invention, and the invention and protection scope also comprise other combinations of the features, as described by the claims.

Clay pigeon shooting range is typically arranged with a plurality of shooter arranged on a line perpendicular on a general launch direction of a set of clay pigeon launchers. Each shooter shoots one round in turn. One or more microphones are set up close to the shooters in the line and is used to trigger next throw of a clay pigeon, alternatively more than one clay pigeon in each round, multiple clay pigeons may be thrown simultaneously or slightly delayed relative each other.

When one shooter has made his/her shot attempts on the thrown clay pigeon(s), it is the next shooter in line having his/her turn at the clay pigeon(s).

The one or more clay pigeon launchers are normally setup for the shooting style of the group in the line.

The present invention introduces a controller for controlling a real time adaption of the clay pigeon thrower characteristics, and an individual token for each shooter. The token may be incorporated in a cartridge basket to be placed at a shooter cartridge basket holder at the shooting stand. The shooter cartridge basket holder may further have incorporated communication means which reads the token and communicates shooter preferences and metadata to a stand controller.

The token comprise individual shooter preferences information, and may be preset to one of a selection of preset shooting setup, wherein the preset setup are defined by the range keeper, or may even comprise individually adapted setup different to the standard setups defined by the range keeper.

It is in a further embodiment of the invention provided a monitoring and tracking feature which enable the individual shooter to visual record and stipulate one or more of clay pigeon flying path, gun aim point, gunshot path, and hit determination and characterization.

In a further embodiment of the invention it is provided a communication interface enabling for example to exchange shooting data and images online with other viewers and/or competitors. Additional features of the communication interface may comprise communicating with analysis tools, and may further provide instant or post feedback to the shooter in form of for example data analysis, graphical output and audio output.

It is further within the scope of the invention to provide an administration environment wherein users can be administrated by an admin role interfacing with the various on-site services and if comprised remote services provided by the system of the present invention.

FIG. 1 describes a traditional clay pigeon shooting range 10, wherein the shooters 49 are put in line 15 for shooting at clay pigeons being thrown from a clay pigeon thrower 11. The throwers will be directed in a general throwing direction 12 with a spread angle a with a widest throwing angle 13.

A shooting session may be controlled and overseen by a range manager 14. Range manager controls the setup of each shooting session, and may also be the referee/judge who judge the outcome of each shot (hit/miss).

FIG. 2 shows a more detailed view of a shooting range 20 that may be setup according to the present invention. The figure illustrates a shooting range having 5 stands comprising a cartridge stand 70 for placing a cartridge basket 37 according to the invention, and a shooter 49. Each stand may have an associated microphone sensor 41 being connected to a communication unit 22 and a number (here 4) of clay pigeon launch units 21. The communication unit 22 may comprise a wired/wireless communication channel interface 23 with associated communication module, for example an internet communication device being wired or wireless, cell phone device or other. The microphone 41 typically reacts to a release command like sound given by the associated shooter 49, and upon such release command activates the communication unit 22 to issue a throwing command to the launch unit 21 being chosen for throwing a clay pigeon according to selected shooting pattern/style. The communication channel may be used to control additional equipment such as one or more s, flood lights, analysis programs on associated computer means or other. A shooting range 20 may comprise any number of stands. The communication unit may further comprise computing means for receiving data from camera assemblies associated with individual shooter, such as on gun mounted camera assemblies. Communication with such camera assemblies may be executed on a wired or wireless network.

FIG. 3A illustrates one example embodiment of a cartridge basket 37 having a handle and a one or more box placeholders 36 for placing boxes of cartridges. The cartridge basket 37 may comprise a cartridge basket identifier 31, 32, 33, 34, 35 which represent the token and which may be integrated in the basket, preferably centrally arranged in the mid-section of the basket 37. The underside 30 of the cartridge basket 37 may provide a contact surface for the cartridge basket identifier 31, 32, 33, 34, 35. The cartridge basket 37 may comprise a handle 39 that is detachably attached to the lower portion of the basket where the box placeholders 36 are arranged. Detaching the handle 39 makes it easier to transport, and thus for each member shooter to purchase and keep a personal cartridge baskets, since they easily de-assemble and require less space for transport. It may be possible to use the cartridge basket without the handle.

FIG. 3B illustrates the cartridge basket seen from below, and one possible way of implementation of the cartridge basket identifier 31, 32, 33, 34, 35 may be a combination of 3 magnet positions in a centrally arranged row in the bottom side of the basket, each magnet position either have or have not a magnet integrated. If the polarity of the magnet is constant, and the reading direction is not controllable, this configuration will comprise 5 different configurations 31, 32, 33, 34, 35 as shown in the 5 different figures of the underside of the cartridge basket 37, where a magnet is present when the magnet position 31, 32, 33, 34, 35 is black, and no magnet is present when white. The magnets 31, 32, 33, 34, 35 are in the illustrated basket arranged in the bottom part of the mid-section 38 of the cartridge basket 37. Other magnet configurations may be user, such as different number of magnets, and the polarization of the magnets being present may be varied. This way it is possible to increase number of variations available in the "coding" of the cartridge basket identifier 31, 32, 33, 34, 35.

The magnet identifier configurations may be replaced by other means of presenting a detectable pattern, for example a barcode pattern on a label attached to the basket or the like, a QR image, or different haptic or tactile pattern recognition mechanisms.

A cartridge basket stand 70 may be provided comprising a top side 71 for receiving the cartridge basket 37. The topside may comprise a recess or sidewalls adapted for holding a cartridge basket. The topside of the basket stand 70 may further comprise detection means/token reader 72 for reading the cartridge basket configuration. This detection means may be magnet configuration detection means, such as magnet sensors or the like. In addition to, or instead of the magnet configuration detection means, an RFID reading and communication unit 73 may be comprised in the cartridge basket stand 70 for reading an RFID device 74 comprised in the cartridge basket 37 or comprised in a token 75 carried by the shooter 49. The RFID device 74 typically may hold information about the shooting session, shooter, gun type, credits available and other.

The cartridge basket 37 may be additionally color coded to enable recognition of cartridge basket identifier 31, 32, 33, 34, 35 coding. In the example shown in FIG. 3A, and 3B cartridge basket 37 may for example be identified by the color code corresponding to magnet configurations: yellow 31, red 32, blue 33, green 34 and brown 35.

When the cartridge basket 37 is arranged on the cartridge stand 70, the cartridge basket identifier 31, 32, 33, 34, 35 may be decoded, and communicated to the communication unit 22. The cartridge basket identifier 31, 32, 33, 34, 35 is chosen by the shooter and may be used to define a desired shooting style, and for example at the same time identifies him/her as a valid shooter.

The cartridge basket identifier 31, 32, 33, 34, 35 may be substituted by a passive or active identification token such as an RFID device being arranged in the cartridge basket 37, or being carried by the shooter for example being integrated in a badge or other physical device, for example a wristband. Using an RFID device instead of or in addition to the magnet configuration increase the flexibility of adding more information to the token, for example user id., payment status and other. Identification tokens may alternatively be implemented in other technologies than RFID. Examples of such alternatives may be smartcards and smartcard readers, for example integrated in the cartridge basket or stand devices communicating either by NFC or wired line, smartphone apps communicating over Wi-Fi or Bluetooth or other. Communication protocols alternatively being implemented for communicating information to and from any of the identification tokens may for example be NFC, Bluetooth, Wi-Fi, and/or others.

In a yet further implementation of the invention the cartridge basket identifier 31, 32, 33, 34, 35 may be substituted by a mobile communication device being able to identify shooter preferences and identification. Mobile communication device may be a smartphone running an app which has been provided by the present invention, and which communicates with the communication unit 22 for identification of shooter, configuration of shooting pattern and style, and optionally connecting to remote services and systems.

In one embodiment of the invention as illustrated in FIG. 4, an individual shooter ramp 40 is exemplified in the shooter 49 has placed the cartridge basket 37 on the cartridge stand 70, and thus identified the preferred shooting pattern. The shooting pattern is communicated to the communication unit 22, which again controls which launch unit to use, and optionally adjust launching unit if possible. A camera 42, 80 is included to illustrate the option to capture images of shooter, shooting view, clay pigeon, and projectile path. Cameras can have different configurations and being applied in multiple numbers as discussed later in this document. The microphone 41 is set up to identify release commands from the shooter. The microphone 41 may additionally be used for recognition if a shot has been fired. A detected shot fired may be used as input for activating increased processing resources for analyzing data streams collected from cameras and sensors. It is within the scope of invention to substitute the microphone with other controller, such as an operating lever or button. A shooting range 20 or shooter ramp 40 may comprise further sensors (not shown) for collection of environmental data, such as temperature, light conditions, humidity, noise, vibration, and other.

The cameras 42, 80 may be arranged to give different views, such as when being arranged at an advantageous place on the stand, it records a view of the shooting situation from an oblique angle 51 looking out from the gun stand and towards the target 33, which in FIG. 5A is a clay pigeon 33. When analyzed, the video signal may be analyzed and present a first trace, dotted line, of the flight 52 of the clay pigeon across the view frame 51. At the same time a second trace, solid line, of the pointing direction 53 of the gun 50 may be presented, such that the two traces may be compared and analyzed.

The same situation is illustrated in FIG. 5B, but here the camera is connected to the gun, and gives a true image of what the shooter sees when posing in a shooting pose. When the cameras 42, 80 are arranged at an advantageous place on the stand, it records a view of the shooting situation from behind the shooter 54 or from a camera 55 being mounted to the gun pipe looking out from the gun stand and towards the target 33, which in FIG. 5A is a clay pigeon 33. When analyzed, the video signal may be analyzed and present a first trace, dotted line, of the flight 52 of the clay pigeon across the view frame 51. At the same time a second trace, solid line, of the pointing direction 53 of the gun 50 may be presented, such that the two traces may be compared and analyzed.

The gun mounted camera may be provided in different designs and implementations, from fully integrated custom built at manufacturer to detachable designs that user can post install, or even just click on when needed. Two such alternative designs are shown in mounted and detached versions in FIGS. 5C-5F. The camera assembly is illustrated for a shot gun having an over-under pipe configuration, but it shall be understood that any pipe configuration and gun type may be used. The camera assembly may be fitted to any type of gun such as: single barrel shotgun, over-under or side by side shotgun, rifle, combination rifle/shotgun and other.

In one camera assembly 56 intended for being mounted to the gun pipe, it advantageously comprises a Gyro feature 57. The gyro 57 is used to measure relative movement of the gun pipe, and thus is providing information for enabling computer means connected in the system to calculate the aiming point of the gun when in a shooting session. To ensure smallest possible deviation it will be advantageous to calibrate the gyro 57 by training the camera assembly towards a known object before shooting session. Both camera 55 and gyro 57 data may be transmitted to the connected communication unit 22. Other sensors (not shown) maybe comprised by the camera assembly 56, such as a temperature sensor, humidity, laser or LIDAR sensor and other.

The cameras output is transmitted to a computing means 61, either directly or via the communication unit 22, for storage and analyzes as shown in FIG. 6. The data from the cameras 42, 55, 80 may be used to analyze shooter pose 64 flight of clay pigeon 52. A further feature may be to analyze the flight of the clay pigeon 33 and the status if it is hit or not, and what degree of hit it has taken. It may be possible to decide if a clay pigeon 33 is hit fully or partly, and possibly an estimated percentage hit. For example 30% disintegrated clay pigeon, which may correlate to an estimated number of individual shotgun pellets hit to the clay pigeon. The same features for analyzing and displaying clay pigeon flight may be used as described for FIGS. 5A and 5B above.

Clay pigeon flight 52, gun pointing path 53, and hit image may be stored for later analysis and comparison, or even used as input in a competition analysis and/or result services.

The analysis of the clay pigeon flight 52 and gun pointing path 53 is performed by provided SW-programs that may run on the computing means 61. The video signals are manipulated to delete all non-vital information, leaving for example only the clay pigeon and optionally a gun sight/outer part of gun/shooter with gun. This requires the SW to perform fairly high speed image recognition. It may be advantageous to use color coding of the clay pigeon which will easily be detected by the SW recognition routines. Distance and speed of clay pigeon flight may be recognized by various techniques, such as if the speed is constant from the launch unit 21, the size and relative x-y-movement may be used to estimate correct distance. If launch site and angle is known, the speed of the flight may be calculated by combining x-y position and image size of clay pigeon. A direction sensitive radar or laser meter may also be implemented, either in the gun mounted camera assembly or separate for the shooting arena, being directed from stand towards launch units.

The gun camera assembly 56 may comprise a medium/high resolution camera 55 and a gyro 57. Other configurations may apply, for example simply a GoPro camera or similar.

The flight path 52 of the clay pigeon is computed from data collected from the gun camera 55 and/or range cameras 42, 80. The gun pointing path 53 is computed from data collected from gun camera 55 and/or gyro 57.

Each shot is evaluated by the SW, and a hit may be recognized when it is detected clay pigeon path 52 direction changes, and/or disintegration of clay pigeon 33, and/or flying chips of clay pigeon material 65. The analysis of a shooting occurrence may be initiated/triggered by detection of any of these detected characteristics, or may be triggered by the shot or release command voice being detected by a sound recognition device and which then trigger a SW routine. Only in the latter trigger situation it may be possible to detect a miss. A miss is identified by when it is not detected clay pigeon path 52 direction changes, and/or disintegration of clay pigeon 33, and/or flying chips of clay pigeon material 65, within a predetermined time period, for example 3 seconds, from launch of clay pigeon after release command voice is detected, or a shorter time period of clay pigeon is released and a shot fired is being detected.

Many of the above discussed features may be used in live hunting session. When using the gun mounted camera 55 and having access to a remote computer, such as a laptop or smart phone, or optionally data storage connected to the camera assembly 56, it is within the scope of the invention to provide an analysis tool for live hunting analysis. SW may then in real time, or post hunting session, analyzes data from the camera assembly, recognizing the specific hunted object (game or the like) and compute game movement path and gun pointing path. SW may recognize different categories of game based on flight path. For example a dove is flying in a different pattern that a crow.

FIG. 6 is further illustrating a viewer display facility 60 wherein the analysis 61, 52, 64 is presented to a viewer 63 together with other related information for example on a big screen or computer screen 62.

In FIG. 7 it is presented an alternative design of a stand comprising both a cartridge stand 70 and a microphone 41.

In FIG. 8A it is presented an alternative design of a camera assembly 81. The camera assembly 81 may comprise more than one camera 80, such as for example two or more cameras 80. The multiple cameras may be directed in different directions, and their use may be as described above for the range cameras. When arranged in a camera assembly 81 it may be advantageous to direct the cameras at different angles outwardly, such that they in combination may cover a wider view angle, or each camera may be actively monitoring different focus areas, such as for example the launch area of different clay pigeon launchers. A camera assembly 81 or camera 80 may further be arranged at or close by a clay pigeon launcher and point outward in the general direction of the estimated clay pigeon trajectory 52.

In FIG. 8B a further camera type is illustrated, a high speed camera 82, for example a high speed PTZ (Pan-Tilt-Zoom) camera. In present invention this type of camera is arranged close by the shooter. The function of the high speed camera 82 is to give a detailed image/video stream of the actual shot hitting the target/clay pigeon. Processing data from a high speed camera is processor resource demanding, and to optimize the use of the processor resources, it is vital to minimize the period of time and amount of information to process.

A problem with using a high speed camera in such a task as this to capture the moving target and flying shooting pellets from a shot is virtually impossible without extremely high capacity processing means. The present invention solves this task in a manner that is less computer resource demanding, and enables a fast, close to real time, response to the user. Combining the range camera 80 data that has identified the target/clay pigeon flight, the direction and path calculations from the image data processing from range camera 80 may be used for controlling the sight line and zoom of the high speed camera 82. Additional input may be as discussed for range camera above, for example direction sensitive radar or laser meter, and/or alternatively LIDAR equipment. When a shot is detected from the shooter, the high speed camera starts to capture images/video in the direction of the target/clay pigeon. The bullet/pellets will typically be captured when closing in on the target, and the hit/miss can be observed and analyzed. If no shot is closing in on the target/clay pigeon within a set time frame from shot fired or when target is out of range, the camera stops filming, and a miss is assumed.

The data processing task comprised in processing data from the high speed camera may use similar manipulation routines as used for processing image data from the range camera 80 in order to eliminate unimportant information from the images/video. A further option is to use Artificial Intelligence, AI, and deep learning methods to train the AI to identify target/clay pigeon and bullet/pellets in the image/video stream. Being able to eliminate background image information will for example enable visualization of relevant data for analysis of the shooting session.

It is possible that LIDAR or other image capturing technologies will be utilized in all the camera positions of present invention. The different camera purpose will however be as explained in this document.

Although some of the various cameras used in different aspects of the present invention is not defined as high speed cameras, it is fully within the concept of the invention to use any type of camera in any of the camera positions, as long as it can serve the purpose of its intended task. For example can any camera be a high speed camera.

A bottle neck operation in present invention is in regards to processing power and capacity for image processing, both from range cameras, and high speed camera for shot detection and visualization. This operation require a lot of computing power, and this is solved by the present invention by limiting the time of image/video stream that is analyzed. In order to pinpoint the most important footage this may be achieved by letting the actual shooting period be controlling the image processing. One way to solve this is to provide a microphone recoding unit control the activation period of the range camera session, and a microphone recoding unit for shot detection control the activation period of the high speed camera session. Since the flight period of the target/clay pigeon is the longest compared to the bullet/shotgun pellets flight towards the target, the range camera is activated first, and may be activated by the shooter initiates start of shooting session by a shout, and when range camera picks out the target, normally a clay pigeon, it initiates a detection routine being controlled by for example the shot such that when shot is fired the high speed camera, which is controlled by directional information deducted from the range camera, is pointed towards the target/clay pigeon, and filming is started. If processing power admits it there may be provided other trigger functions, such as shooter posture detection and recognition, continuous operation of some or all cameras, or other. When high speed camera is controlled by the analyses of the range camera, it is ensured that the high speed camera is pointed towards the target at the time when the shot is fired.

FIG. 8C show a possible embodiment of a combined camera house wherein a field camera 80 is arranged in the same housing as the high speed camera 82. It is not a requirement to put these in the same housing, and may well be arranged in separate housings. As illustrated the embodiment in FIG. 8C has a static field camera zoomed to capture most/all of the shooting range field outwards from the shooter. The image captured is analyzed, and a function identifying a moving target, such as a clay pigeon, is provided. FIG. 8D illustrates a setup where CAM1 is the static field camera and the picture square identified by CAM 1 is the aperture view of the field camera 80. The high speed camera is movable, and movement is controlled by a controller receiving directional input from the analyzing program analyzing the video stream received from CAM1. CAM 2 is the high speed camera 82, that may be movable, for example around an x-axis and a y-axis, to be able to follow a moving target at a close range view. In FIG. 8D the captured view of CAM 2 is illustrated by the square identified by CAM 2 in upper left corner.

FIG. 8E illustrates a view from the high speed camera 82, CAM 2, when a bullet hits the clay pigeon.

A problem, on a shooting range, is to discriminate which sound source/input to use as valid and which to exclude. In order to minimize error sources from sources of sound inputs to the microphone, the microphones may be constructed such as to provide a strong directional discriminating incoming detection angle. The microphone may for example record sound only from a 30° angle (+/−15°) measured in the pointing direction of the microphone. A sound check may be necessary to be performed before each shooting session. Some or all of the microphones may further be arranged to be adjustable, such that pointing the microphone's focal direction towards the sound source may be possible. Movement in at least two directions may be provided. A further optional feature by the system invention is to provide one or more of the microphones as handheld carry on microphones (not shown), carry on here in the meaning of being clasped onto a garment or weapon of the shooter, the carry on microphones being able to communicate with a nearby computing means, stand or other.

A further option in the sound discriminating task is to use voice recognition. At least two strategies may be used, exclusively or in combination. One being voice recognition based on a prerecorded sound impression of shooter command, and store this to a user profile of the shooter. When shooter is identified at the shooting range, any sound picked up by the stand microphone can be checked towards recoded sound profiles of the shooter to recognize the commands given by the shooter. Shots may also be recorded in a similar way to identify for example gun type, and/or ammunition type. A further sound recognition mechanism is to use Artificial Intelligence and deep learning to discriminate between various commands, but also shot identification.

Present invention may use more than one microphone, and the one or more microphone may be arranged as a standalone unit, combined with one or more of the cameras, integrated with the stand, integrated in the cartridge basket or other. A microphone may also communicate with the computing means, in stand, on range or remote via wireless or wired communication. The same microphone may be use either for both command recording and shot recording or only one of command recording or shot recording.

Other sensors (not shown) maybe comprised by the various devices of the system, such as a temperature sensor, humidity sensors and other. All able to monitor and transmit sensor data to the analyzing processes of the system.

In FIG. 9A it is presented an alternative design of a display stand 91, and a big screen display 92. Display stand 91 may be arranged to be close to the shooter 49, or even integrated with the cartridge stand 70.

FIGS. 9B and 9C illustrated a further display means option wherein the stand 70 itself has connecting means (not shown) for connecting and attach a mobile/handheld screen 93, for example a PAD or the like. The attachable mobile/handheld screen may communicate with any of the computing means over a wireless or wired network, and the mobile/handheld screen may operate on a carry on power source or be powered from the stand. The mobile/handheld screen may further offer a user interface wherein the screen is touch sensitive and may offer a dialogue channel for the user. The Input from the user may be collected through touch sensitive screen menus or character input, or a microphone may be integrated in the detachable lightweight screen to receive voice input. The stand or lightweight screen may further be provided with a separate connection point for a further pose camera 94, typically used for shooter pose recording. The light weight screen is also an output channel for showing recordings of the footage made by the different cameras in the system, and also for analysis data augmented upon these footages. The light weight screen is also adapted for being carried by the shooter around the arena, and may also comprise sufficient processing power to handle data communication from the cameras and other computing units in the system, and may also comprise analysis processing capacity and features enabling a subset of the full analysis features comprised by the present system invention. Features comprised may for example be body pose analysis, hit success analysis, gun movement and aiming, and other.

All devices including cameras, microphones and computing means may communicate wirelessly or by wired communication or a combination thereof. Wireless communication may be provided by WI-Fi devices and protocols, Bluetooth devices and protocols, or other.

A system according to the present invention may comprise one or more parts of the system shown in FIG. 10. The devices and system for personalization and customized setup and communication of shooting range controlling and scoreboard monitoring according to the invention may comprise a cloud 100 communication platform being controlled by a service provider 101, comprising computing means and storage means. The cloud communicates through communication links 102 to each individual component of the system. This may include both wired and wireless communication lines. One or more shooting ranges 90 may be connected simultaneously, and results and data may be compared regardless of origin of the shooting range 90. Each shooting range 20 may be composed of one or more individual shooting stands 40 for single shooter 49. Each shooting range 20 or shooting stand 40 may comprise computing means 192 and/or communication means 22 to facilitate individual analysis of data collected from video and sensors arranged at the shooting range 20.

The system implemented in the computing means 101, 104 may further comprise credit escrow, enabling the shooter to register payment and receive credits for controlling the availability of the shooting range facilities. Credits may be stored in the on-site computing means 104, 22, and keep track of credits available for the individual shooter. Other services may easily be adapted to draw credits for services offered, such as personal assistance/trainer/feedback, food and beverage, participation in competitions onsite and/or off-site and other. Credits may be linked to the user id encompassed in an RFID device checked out at the site. RFID according to the invention may be embedded in the cartridge basket 37 or in a personal carry on badge, bracelet or the like. A shooting range 20 or shooters stand 40 may communicate individually on a LAN, or via wireless communication medium 103 locally to shooting rage computing means 104. Typically computing means will be used to analyze video input from the shooting range 20 or shooters stand 40 to analyze hit, shooters 49 posing and activities, and perform statistical analysis of shooters 49, individually or as a group.

Viewer display facilities 60 may be located with a shooting range 20 wherein it is connected directly to the computing means 104 analyzing the data from the activities at the shooting range 20, and/or it may be communicating with the service provider 101 via the cloud and present a mix of local and remote shooting range 20 results. Thus, a competition between competitors may be held with competitors 49 performing individually at different shooting ranges 20, 40.

A viewer display facility 60 may be provided at a remote location without being collocated with a shooting range 20, 40.

Figure 11A:
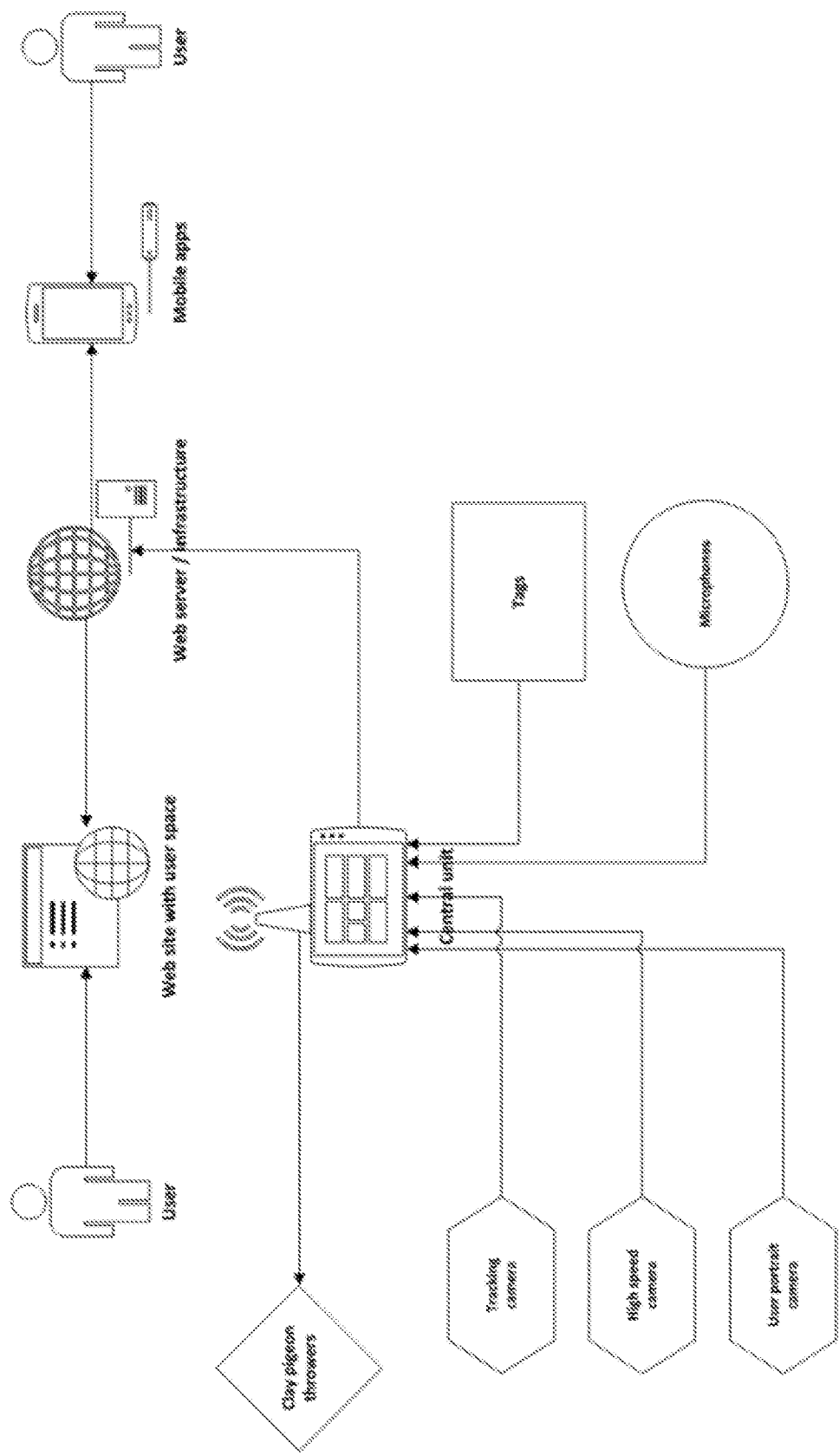

A further system implementation is illustrated in FIG. 11A wherein a communication unit is a central unit in regards of communicating data to/from the launch units 21, the cartridge holders 37, the stands 70, the microphones 41, the field cameras 42, 80, the high speed cameras 82, the tracking cameras 80 and the sensors. A communication unit is connected to a webserver or central communication unit wherein for example a control room/instructor room facilities are located, and the server features combined herein communicates with light weight screens, mobile units, cellphones and the like being used in and around the shooting range by the users and spectators. The server may further host or communicate data to/from a user/spectator web site, serving applications such as club sites, databases, server applications, result services, Facebook, Instagram and other social media applications and the like.

Figure 11B:
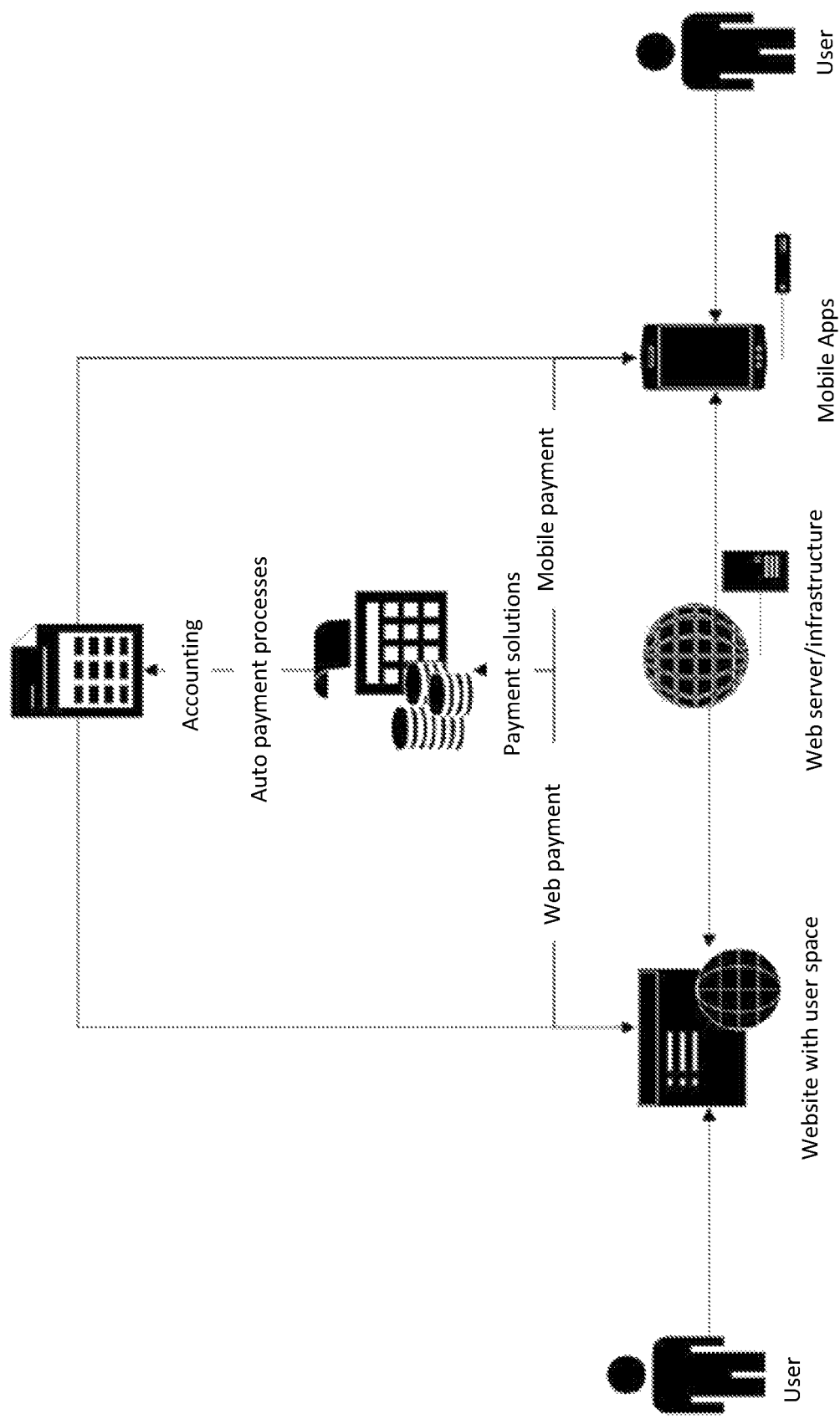

FIG. 11B illustrates the same environment, wherein the web services, web sites, user space, mobile apps are associated with a payment structure for providing invoicing an payment for services offered by the system. The payment service may be a coupon/token driven payment, letting service provider get up-front payment, and user will receive a number of coupons to be used on the various services, such as a number of shots, detailed analysis, club accessories and other. It is also possible to enable a real time payment for each service used by the user on a pay for services base. Payment service may also comprise the use of rewards, such that a user may be granted free coupons/tokens for use to receive free run, services or products.

The administration tasks, admin role, may be added to the features offered by the webserver and/or the central unit. The admin role may also take on the tasks normally performed by the range keeper as described above. The admin role may be allocated to one or more persons, for example different persons in pre shooting activities, under shooting activities and after shooting activities.

The system of the invention may provide a Graphical User Interface, GUI, on a computer or mobile communication device, as a running computer application or as an App for communicating and handling administration tasks.

Examples of administration tasks performed by the admin role is for example registration of new shooters arriving at the range. This may be done by a manual input of information provided by the shooter, or if the shooter has his personal token, the token may comprise the required registration data and be read by a token interface provided by the admin computer/mobile communication device, wherein the token interface may comprise means for communicating with the token. The token interface being one of or equivalent to an NFC communication device, RFID reader or other wireless communication platform, a smartcard reader, USB interface or other wired communication platform.

The administration tasks may also comprise to manage and set up various shooting patterns required by the shooter.

One further aspect of the administration tasks is to manage payment services and allocation of credits usable for the services offered by the system. The credits maybe transferred to the user token such that the token can act as a "payment"-card for services provided.

In one embodiment the registration of a first time user, the system may be provided with a feature for accepting a payment card, NFC payment card or equivalent loyalty card as a token, such that the user/shooter may present the accepted card as both token and direct payment card when using a service of the system. It would be a requirement in most cases for the admin role to control the user identity before such personal cards would be authorized to be accepted as tokens.

Admin role may also define if user/shooter is member, non-member, discount eligible, added fee eligible, licensed for which service such as what weapon type, shooting pattern, or shooting track, or other. The services available for the individual user would be allocated to the token, and user may be prohibited by the system to access other than permitted services.

The admin role, and provided features of administration app/ programs may comprise to administrate groups of shooters, and the order of which shooter is active at any one time.

Admin role when use in the game keeper role may comprise to define the setup of the shooting range being active at any time.

The admin role may also be to define which data from a session shall be recorded and/or analyzed and/or published, and if published, on what forum the published data should be available.

Now, various embodiment use scenarios are discussed. These scenarios are provided as examples of how the invention may be used, and is shall be regarded in its broadest sense and not represent any limitation to the scope of protection. It is the attached claims that define the protection scope of the invention.

In a first embodiment example the shooting range implements the cartridge basket 37 comprising the cartridge basket identifier 31, 32, 33, 34, 35 in the form of 3-position magnets and wherein each shooting stand has a cartridge stand 70 able to read the magnet configuration.

The invention may further defined by:
A first embodiment of a token 30, 74, 75 for identification of a persons required shooting pattern participating in a range shooting activity, the token 30, 74, 75 comprising at least an identification of a required shooting pattern and a communication means for communicating the required shooting pattern to a communication unit 22.

A second embodiment according to the first embodiment of a token 30, 74, 75 for identification of a persons required shooting pattern participating in a range shooting activity, wherein the token 30, 74, 75 further comprising a user identification and communication means for communicating the user identification to the communication unit 22.

A third embodiment according to the first or second embodiment of a token for identification of a persons required shooting pattern participating in a range shooting activity, wherein the token 74, 75 comprise a wireless communicating device such as an RFID device comprising one or both of required shooting pattern and user identification.

A fourth embodiment according to any of the first to third embodiment of a token 30, 74 for identification of a persons required shooting pattern participating in a range shooting activity, wherein the token is embedded in a cartridge basket 37.

A fifth embodiment according to the fourth embodiment of a token for identification of a persons required shooting pattern participating in a range shooting activity, wherein the cartridge basket 37 is color coded to identify the required shooting pattern defined by the token.

A sixth embodiment according to any of the first to fifth embodiment of a token for identification of a persons required shooting pattern participating in a range shooting activity, wherein the required shooting pattern is identified by a number of magnets 31, 32, 33, 34, 35 being arranged in a recognizable pattern, and the communication means for communicating the required shooting pattern to the communication unit 22 comprise magnet detection means able to detect the magnet pattern for selection of required shooting pattern.

A seventh embodiment according to the sixth embodiment of a token for identification of a persons required shooting pattern participating in a range shooting activity, wherein the magnet 31, 32, 33, 34, 35 pattern is a selection of pattern being insensitive to the orientation of the magnets 31, 32, 33, 34, 35 relative the magnet detection means 37.

An eight embodiment according to any of the first to fifth embodiment of a token for identification of a persons required shooting pattern participating in a range shooting activity, wherein the required shooting pattern is identified by one of a barcode pattern, a QR image, different haptic patterns or different tactile patterns.

A first embodiment of a token reader 72, 73 for determining identification information in a token 30, 74, 75 as defined by any of the first to seventh embodiment of a token for identification of a persons required shooting pattern participating in a range shooting activity, wherein the token reader 72, 73 comprise a token reader communication unit for receiving information from the token 30, 74, 75 and communicating the information to a range communication unit 22 or computer means 104.

A second embodiment according to the first embodiment of a token reader 72, 73 for determining identification information in a token 30, 74, 75, wherein the token reader 72, 73 is implemented in a cartridge stand 70.

A third embodiment according to the second embodiment of a token reader 72, 73 for determining identification information in a token 30, 74, 75, wherein the stand 70 further comprise a microphone sensor for detecting release commands or shots, and the microphone sensor 41 is communicating information to the range communication unit 22 or computer means 104.

A first system for identification of a persons required shooting pattern participating in a range shooting activity, the system comprising:
 a token 30, 74, 75 wherein the token comprising a selector/identifier 31,32,33,34,35 for required shooting pattern,
 one or more launch units 21,
 a range communication unit 22 for communicating with token and launch units 21,
 a token reader 72, 73, wherein the token reader 72, 73 comprising a device for reading the selector/identifier 31,32,33,34,35 in the token and a communication device for communicating information read from the token to the range communication unit 22.

A second system according to the first system for identification of a persons required shooting pattern participating in a range shooting activity, wherein the token is implemented in an RFID device.

A first method for identification of a persons required shooting pattern participating in a range shooting activity, the method comprising the steps:
 selecting required shooting pattern by selecting a token 30, 74, 75, wherein the token identifying the required shooting pattern,
 presenting the token 30, 74, 75 for the token reader 72, 73 arranged at a shooting stand,
 the token reader 72, 73 reading the token 30, 74, 75, and then transmitting the information to a range communication unit 22,
 the range communication unit 22 instructing a launch units 21 of selected shooting pattern.

A second method according to the first method for identification of a persons required shooting pattern participating in a range shooting activity, wherein the token is implemented in an RFID device.

In a first embodiment device for image capture and analysis of a shooting session, the device comprising:
 one or more image capturing devices,
 shooting session trigger,
 image processing resources,
 the image processing resource comprising:
  a target detection routine, and
  a target hit detection routine.

A second embodiment device for image capture and analysis of a shooting session according to the first embodiment device for image capture and analysis of a shooting session, wherein the device has at least two image capturing devices, wherein a first of the image capturing devices is a shooting range camera for capturing the shooting target trajectory, and the target detection routine comprise image recognition function for recognizing target in the image captured by the first image capturing device.

A third embodiment device for image capture and analysis of a shooting session according to the first or second embodiment device for image capture and analysis of a shooting session, wherein one of the one or more image capturing devices is a gun mounted camera arranged to capture the view in a general direction the gun is pointing.

A fourth embodiment device for image capture and analysis of a shooting session according to the third embodiment device for image capture and analysis of a shooting session, wherein the image processing resources comprise a routine for identifying the pointing trajectory of the gun mounted camera in the image captured by the first image capturing device.

A fifth embodiment device for image capture and analysis of a shooting session according to any of the first to fourth embodiment device for image capture and analysis of a shooting session, wherein a third image capturing device is a camera for capturing the imager of a shooter posing for a shooting session at a shooting stand.

A sixth embodiment device for image capture and analysis of a shooting session according to any of the second to fifth embodiment device for image capture and analysis of a shooting session, wherein a further image capturing device is a camera for capturing the target image at close range view, and the further image capturing device is controlled by a target position detected by the target detection routine analyzing the image captured by any of the first or second image capturing devices.

A seventh embodiment device for image capture and analysis of a shooting session according to any of the second to sixth embodiment device for image capture and analysis of a shooting session, wherein one or more of the image capturing devices are high-speed cameras.

An eighth embodiment device for image capture and analysis of a shooting session according to any of the second to seventh embodiment device for image capture and analysis of a shooting session, wherein one or more of the image capturing devices are video cameras.

A first system for image capture and analysis of a shooting session, the system comprising:
one or more devices for image capture and analysis of a shooting session as described in claims 16 to 23,
communication means for communication of image data from the image capturing devices,
computing means for analyzing the image data, and
display means for outputting the analyzed image data.

A second system for image capture and analysis of a shooting session according to the first system for image capture and analysis of a shooting session, further providing a cloud communication platform comprising the computing means and storage means.

A third system for image capture and analysis of a shooting session according to the first or second system for image capture and analysis of a shooting session, wherein the system further comprise a token management system for providing users with user tokens, and the user tokens comprising shooting preferences and credits.

A fourth system for image capture and analysis of a shooting session according to any of the first to third system for image capture and analysis of a shooting session, the system further comprising one or more shooting stands, the shooting stand comprising a token reader and a shooting session initiation detector.

A fifth system for image capture and analysis of a shooting session according to the fourth system for image capture and analysis of a shooting session, wherein the system further comprise a shooting pattern controller, and the shooting pattern controller accepting shooting pattern controlling data from one of preset configuration, individual setup date from user token, or range keeper instructions.

A sixth system for image capture and analysis of a shooting session according to any of the first to fifth system for image capture and analysis of a shooting session, the system further comprising a payment schedule, wherein the user token comprise credits awarded by a payment routine for purchasing services offered by the system.

A first method for image capture and analysis of a shooting session, the method comprising the following steps:
activating one or more devices for image capture and analysis of a shooting session,
identifying the initiation of a shooting session by detecting a trigger occurrence,
capturing an image of the target,
analyzing the image of the target,
detecting hit of target.

A second method for image capture and analysis of a shooting session according to the first method for image capture and analysis of a shooting session, the method further comprise the steps:
detecting a shot fired,
detecting position of the target in the captured image and using the detected position to control image view of a high speed image capturing device,
capturing a close up view of the target by the high speed image capturing device.

A third method for image capture and analysis of a shooting session according to the second method for image capture and analysis of a shooting session, the method further comprise the steps:
analyzing the close up view of the target, and
detecting the fired bullet or shotgun pellets trajectory relative target trajectory.

A fourth method for image capture and analysis of a shooting session according to the third method for image capture and analysis of a shooting session, the method further comprise the steps:
displaying the analyzed shooting session on a display.

A fifth method for image capture and analysis of a shooting session according to any of the first to fourth method for image capture and analysis of a shooting session, wherein one or more of the one or more image capturing devices are capable of capturing a video stream, and the method further comprise:
displaying a complete shooting session with target flight.

The invention claimed is:

1. A device for image capture and analysis of a target shooting session, the device comprising:
one or more cameras configured to provide images of a target under the target shooting session, wherein said one or more cameras are video cameras;
a sensor configured to detect commands from a user or shots fired by the user for activation; and
a processor configured to:
detect the target thrown from a launcher in the images;
analyze the images of the target; and
detect whether or not a hit of the target has fully or partly occurred, and
identify an estimated percentage hit when the hit of the target has fully or partly occurred.

2. The device according to claim 1,
wherein the device comprises at least two cameras,
wherein a first camera of the at least two cameras is a shooting range camera for capturing a shooting target trajectory, and
wherein the processor is further configured to recognize a target in an image captured by the first camera to detect the target.

3. The device according to claim 1 further comprising a third camera for capturing an image of a shooter posing for a shooting session at a shooting stand.

4. The device according to claim 1 further comprising a camera for capturing a target image at close range view, which is controlled by a target position detected by the processor analyzing the image captured by any of the cameras.

5. The device according to claim 1, wherein one or more of the one or more of the cameras are high-speed cameras.

6. The device according to claim 1, wherein the target is a clay pigeon.

7. A system for image capture and analysis of a shooting session, the system comprising:
one or more devices for image capture and analysis of a shooting session as described in claim 1,
a transmitter configured to communicate image data from said one or more cameras,
a computer for analyzing the image data, and
a display for outputting the analyzed image data.

8. The system according to claim 7, further comprising a cloud communication platform comprising the computer and a data storage.

9. The system according to claim 7, further comprising a token management system for providing users with user tokens, and the user tokens comprising shooting preferences and credits.

10. The system according to claim 7, further comprising one or more shooting stands comprising a token reader and a shooting session initiation detector.

11. The system according to claim 10, further comprise a shooting pattern controller configured to accept shooting pattern controlling data from the group consisting of one of preset configuration, individual setup date from a user token, and range keeper instructions.

12. The system according to claim 7, further comprising a payment schedule, wherein a user token comprises credits awarded by a payment routine for purchasing services offered by the system.

13. A method for image capture and analysis of a target shooting session, the method comprising:
- activating one or more devices for image capture and analysis of a shooting session as described in claim 1,
- identifying initiation of the shooting session by detecting the commands from the user or the shots fired by the user,
- capturing the video images of the target,
- detecting the images of a target thrown from a launcher,
- analyzing the target image and detect that a hit, fully or partly, has occurred, and
- estimating a percentage hit of the hit that has fully or partly occurred.

14. The method according to claim 13, further comprising:
- detecting a shot fired,
- detecting position of the target in the captured image, and
- using the detected position to control image view of a high speed image capturing device, and
- capturing a close up view of the target by the high speed image capturing device.

15. The method according to claim 14, further comprising:
- analyzing the close up view of the target, and
- detecting a trajectory of a fired bullet or shotgun pellets relative to a trajectory of the target thrown from the launcher.

16. The method according to claim 15, further comprising: displaying an analyzed shooting session on a display.

17. The method according to claim 13, wherein one or more of the one or more image capturing devices are configured to capture a video stream, and the method further comprising:
- displaying a complete shooting session with the target.

* * * * *